US006459997B1

(12) United States Patent
Andersen

(10) Patent No.: US 6,459,997 B1
(45) Date of Patent: Oct. 1, 2002

(54) METHOD FOR EVENT ANALYSIS AT AN INTELLIGENT ELECTRONIC DEVICE

(75) Inventor: Bo L. Andersen, Burlington, CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/221,242

(22) Filed: Dec. 28, 1998

(51) Int. Cl.[7] .............................................. G01R 15/00
(52) U.S. Cl. ........................... 702/57; 702/66; 702/67; 714/47; 700/292; 700/293; 700/294
(58) Field of Search ............................. 361/36, 65, 76, 361/88–94; 364/571.05; 702/55, 68, 108, 67, 62–66; 700/286, 292, 293, 294; 714/4, 47; 703/18

(56) References Cited

U.S. PATENT DOCUMENTS

| | | | | |
|---|---|---|---|---|
| 4,539,618 A | * | 9/1985 | Stich | 361/94 |
| 4,589,074 A | | 5/1986 | Thomas et al. | 702/68 |
| 4,591,782 A | | 5/1986 | Germer | 324/103 R |
| 4,745,512 A | * | 5/1988 | Hampson | 361/36 |
| 4,748,573 A | | 5/1988 | Sarandrea et al. | 702/108 |
| 5,325,315 A | * | 6/1994 | Engel et al. | 364/571.05 |
| 5,367,670 A | | 11/1994 | Ward et al. | 714/47 |
| 5,684,710 A | | 11/1997 | Ehlers et al. | 700/293 |
| 5,890,097 A | | 3/1999 | Cox | 702/67 |
| 5,963,734 A | * | 10/1999 | Ackerman et al. | 703/18 |
| 6,137,418 A | | 10/2000 | Zuercher et al. | 340/648 |

FOREIGN PATENT DOCUMENTS

EP 0863596 A 9/1998

OTHER PUBLICATIONS

Michael Daish; Power Monitoring Software Improves Measurements, Simplifies Analysis, and Generates Report, 1995; Intertec, int, Ventura, CA; pp. 94–120.*
Database Inspec 'Online! Institute of Electrical Engineers, Stevenage, GB Daish M: "Power monitoring software improves measurements, simplifies analysis, and generates report" Database accession No. 5334508 XP002136503 abstract & Official Proceedings of the Eighth International Power Quality Solutions '95. Presented at Powersystems World '95 Conference and Exhibit, Proceedings of PCIM/ Power Quality '95. Powersystems World, Long Beach, CA, USA, Sep. 9–15, 1995, pp. 94–120,1995 Ventura, CA, USA, INtertec Int, USA ISBN: 0–931033–58–6.
Koval D O: "Computer Performance Degradation Due to Their Susceptibility to Power Supply Distrubances" Conference Record of the Industry Applications Society Annual Meeting. (IAS), US, New York, IEEE, vol. CONF. 24, 1989, pp. 1754–1760, XP000091753.

* cited by examiner

Primary Examiner—Andrew H. Hirshfeld
Assistant Examiner—Minh Chau
(74) Attorney, Agent, or Firm—Cantor Colburn LLP

(57) ABSTRACT

A method of event analysis in an intelligent electronic device is presented. The intelligent electronic device includes a microprocessor and associated memories. An algorithm (program) stored in a memory of the intelligent electronic device analyzes events of an electrical distribution system at the intelligent electronic device.

50 Claims, 3 Drawing Sheets

METHOD FOR EVENT ANALYSIS AT AN INTELLIGENT ELECTRONIC DEVICE

BACKGROUND OF THE INVENTION

This invention relates generally to intelligent electronics devices (IEDs), e.g., electronic trip units or protective relays. More specifically, the present invention relates a method of event analysis of an electrical distribution system at an electronic trip unit or protective relay, i.e., an intelligent electronic device.

Intelligent electronic devices are well known. By way of example, an electronic trip unit (one such intelligent electronic device) typically comprises voltage and current sensors which provide analog signals indicative of the power line signals. The analog signals are converted by an A/D (analog/digital) converter to digital signals which are processed by a microprocessor. The trip unit further includes RAM (random access memory), ROM (read only memory) and EEPROM (electronic erasable programmable read only memory) all of which interface with the microprocessor. The ROM includes trip unit application code, e.g., main functionality firmware, including initializing parameters, and boot code. The EEPROM includes operational parameters for the application code.

Many electronic trip units (as well as other intelligent electronic devices) support event based waveform capture. That is, a cyclical sampling buffer constantly storing the real time digitized data of per-phase currents and voltages. Based on a user defined event trigger condition or a pre-defined event condition the buffer is frozen to preserve a representation of several cycles before and after the occurrence of an event. The data in the buffer allows for the subsequent analysis of the event.

However, users often express confusion regarding how to interpret this data. Voltage and current fluctuations can occur for a variety of different reasons, e.g., lightening strikes, large loads being added to or removed from the system, fault conditions that may have occurred or been cleared from the system. With just the raw data of the captured waveform to analyze, it is difficult to determine the source or potential impact of such a fluctuation. Additionally, it is also difficult to determine from the raw data if the frequency, duration, and magnitude of the fluctuations will affect the performance and/or the integrity of equipment powered by the electrical system. Severe fluctuations may damage connected loads.

Information Technology Industry Council (ITI), formerly the Computer Business Equipment Manufactures Association (CBEMA), defined an ITI (CBEMA) Curve as a guideline or standard. This Curve describes an a.c. voltage input boundary which typically can be tolerated by most Information Technology Equipment (ITE), e.g., computer controlled manufacturing equipment, computers, printers, copiers, facsimile machines, etc. The Curve is directed to both steady-state and transitory conditions.

BRIEF SUMMARY OF THE INVENTION

It is therefore seen to be desirable to analyze characteristics of an electrical distribution system relative to a standard. This is done from within an intelligent electronic device. Briefly, in accordance with one embodiment of the present invention the ITI Curve as a standard to observed voltage data is used for assessing operating characteristics of an electrical distribution system, and to determine if operating conditions are safe for power equipment and characterize power anomalies accordingly.

A method of event analysis of an electrical distribution system at an intelligent electronic device (e.g., an electronic trip unit or protective relay) is presented. An electronic trip unit is described herein by way of an exemplary embodiment only, as the present invention applies to other intelligent electronic devices as well. The electronic trip unit comprising voltage and current sensors which provide analog signals indicative of the power line signals. The analog signals are converted by an A/D (analog/digital) converter to digital signals which are processed by a microprocessor. The trip unit further includes RAM (random access memory), ROM (read only memory) and EEPROM (electronic erasable programmable read only memory) all of which communicate with the microprocessor. The ROM includes trip unit application code, e.g., main functionality firmware, including initializing parameters, and boot code. The application code includes code for the event analysis algorithm of the present invention. The EEPROM includes operational parameters, e.g., code for setting the ITI Curve parameters for the application code. These parameters may be stored in the trip unit at the factory, but can also be remotely downloaded to incorporate updates and changes in the standard.

In an exemplary embodiment of the invention, the event analysis algorithm of an intelligent electronic device senses and quantifies data indicative of an event. The algorithm then determines the relationship of the quantified data to standards data indicative of a standards curve, and identifies the event based on this relationship to the curve.

In another embodiment of the invention, four quadrants are defined with respect to the ITI Curve, which substantially represent events corresponding to sags, surges, interruptions, or transients, as defined herein. Each event (data from a captured waveform) is then characterized as belonging to a safe or an unsafe region within each of the four quadrants. Thus, providing an analysis of the events.

The invention greatly reduces the confusion and time required to interpret the data from a captured waveform. Information relevant to the source of a current or voltage fluctuation can then be obtained from the location, frequency, duration, and magnitude of the fluctuation.

Additionally, the event analysis algorithm of the present invention is performed within the intelligent electronic devices itself. The analyzed and plotted information can either be read out on a display attached locally to the intelligent electronic device, or remotely to a central monitoring station. This is a significant advantage in large facilities containing many intelligent electronics devices capable of event based waveform capture that can be simultaneously affected by a single voltage fluctuation. The total volume of data required to be received and processed by the central monitoring station is greatly reduced. This represents a significant savings in data transmission time, processing time, computer processing capacity, and manual operator analysis.

DETAILED DESCRIPTION OF THE INVENTION

Figure 1:
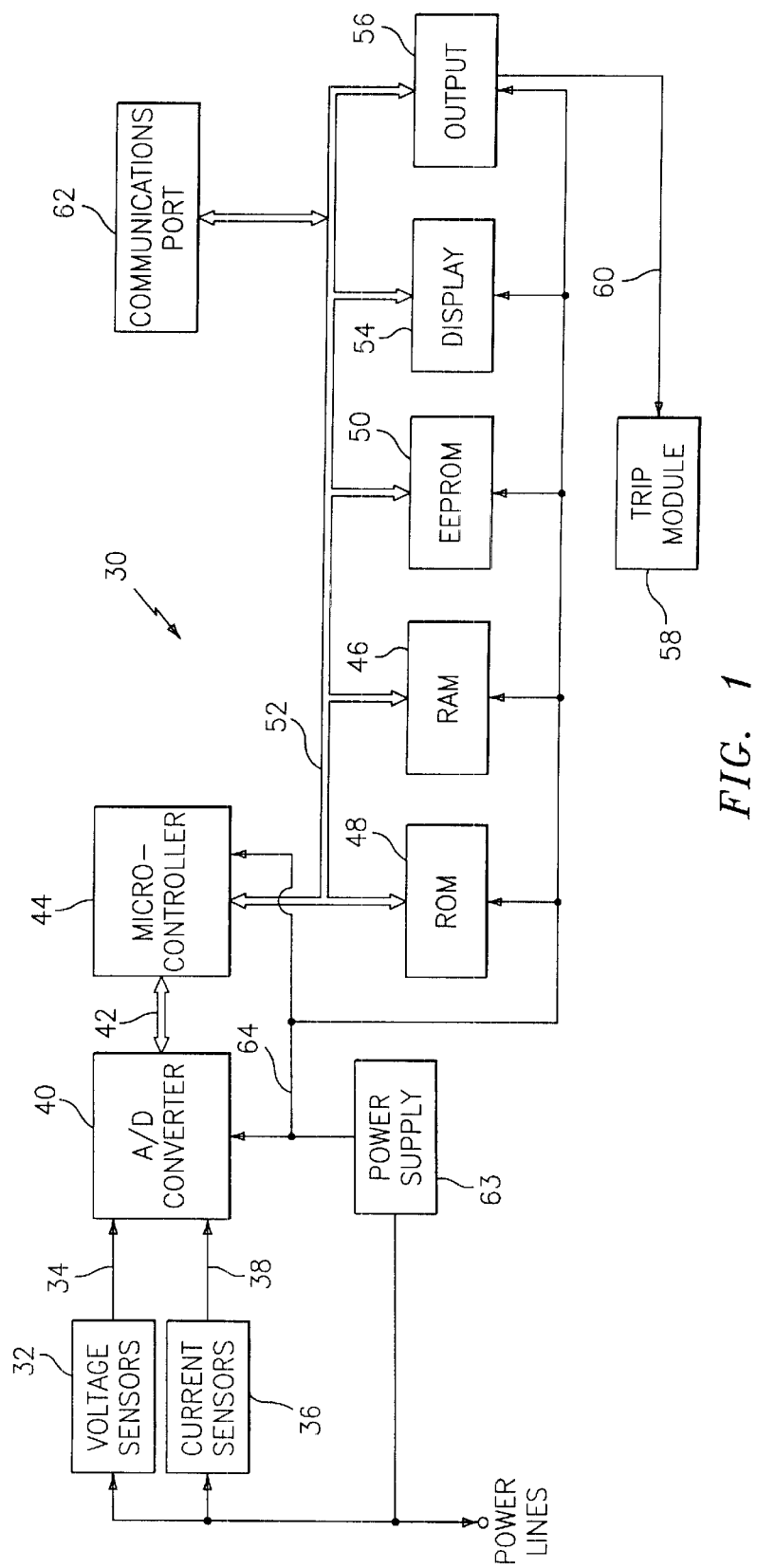
FIG. 1 is a schematic block diagram of a typical intelligent electronic device.

Referring to FIG. 1, a general schematic of a trip unit is generally shown at 30. It will be appreciated that the present invention is not limited to electronic trip units but is directed IEDs in general. Trip unit 30 comprises a voltage sensor 32 which provides analog signals indicative of voltage measurements on a signal line 34 and a current sensor 36 which provides analog signals indicative of a current measurements on a signal line 38. The analog signals on lines 34 and 38 are presented to an A/D (analog/digital) converter 40, which converts these analog signals to digital signals. The digital signals are transferred over a bus 42 to a microprocessor (signal processor) 44, such being commercially available from the Hitachi Electronics Components Group (Hitachi's H8/300 family of microprocessors). Trip unit 30 further includes RAM (random access memory) 46, ROM (read only memory) 48 and EEPROM (electronic erasable programmable read only memory) 50 all of which communicate with the microprocessor 44 over a control bus 52. It will be appreciated that A/D converter 40, ROM 48, RAM 46, or any combination thereof may be internal to microprocessor 44, as is well known. EEPROM 50 is nonvolatile so that system information and programming will not be lost during a power interruption or outage. Data, typically status of the circuit breaker, is displayed by a display 54 in response to display signals received from microprocessor 44 over control bus 52. An output control device 56, in response to control signals received from microprocessor 44 over control bus 52, controls a trip module 58 via a line 60. Calibration, testing, programming and other features are accomplished through a communications I/O port 62, which communicates with microprocessor 44 over control bus 52. A power supply 63 which is powered by the service electricity, provides appropriate power over a line 64 to the components of trip unit 30. ROM 48 includes trip unit application code, e.g., main functionality firmware, including initializing parameters, and boot code. The application code includes code for the fault prediction algorithm of the present invention.

EEPROM 50 includes operational parameter code, e.g., code for the ITI Curve parameters. These parameters may be stored in the trip unit at the factory, but can also be remotely downloaded as described hereinafter. The event analysis algorithm is run in real-time and is initiated preferably from the boot code at start up. In an exemplary embodiment of the invention areas are defined with respect to the ITI Curve, which substantially represent events corresponding to sags, surges, interruptions, or transients, as defined herein. Each event (data from a captured waveform) is then characterized as belonging to safe or unsafe regions of the respective areas. Thus, providing an analysis of the events.

Figure 2:
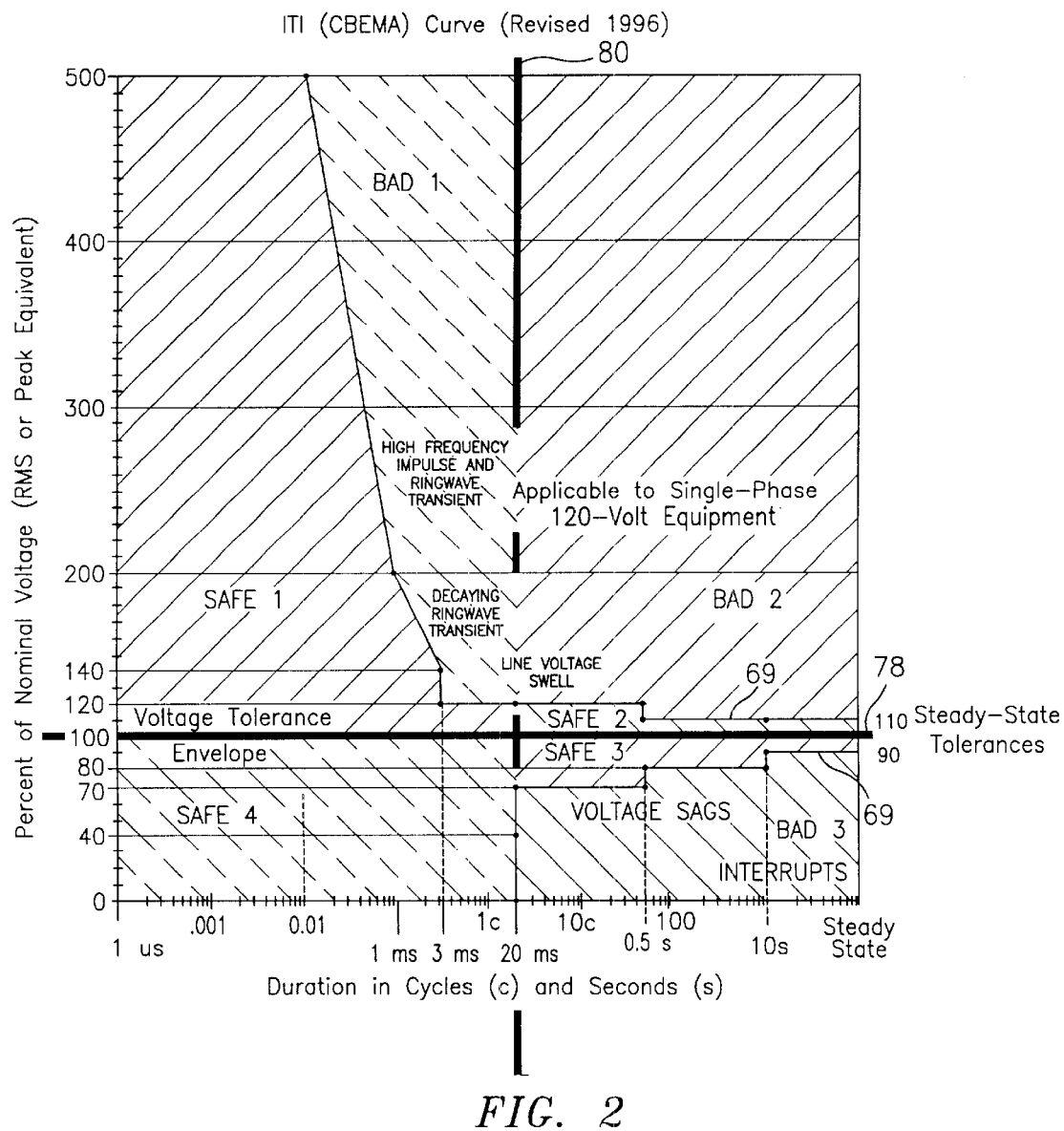
FIG. 2 is a graph of the ITI Curve (Revised 1996) divided into quadrants in an exemplary embodiment of the present invention.

Referring to FIG. 2 a plot of the ITI Curve (Revised 1996) is shown at 69. Data indicative of the ITI Curve 69 is stored in EEPROM 50 of the trip unit 30. Several types of events are addressed by the Curve. Steady-state tolerances are defined by a steady-state range where a RMS voltage is either very slowly varying or is constant. The subject range is +/−10% from the nominal voltage. The term "nominal voltage" implies an ideal condition of, e.g., 120V RMS, 60 Hz. Any voltages in this range may be present for an indefinite period, and are a function of normal loadings and losses in the distribution system. A line voltage swell (surge or overvoltage) event is defined as a region where a voltage swell having an RMS amplitude of up to 120% of the RMS nominal voltage, with a duration of up to 0.5 seconds. This transient may occur when large loads are removed from the system or when voltage is supplied from sources other than the electric utility. Low-frequency decaying ringwave transient events are defined as a region where a decaying ringwave transient typically results from the connection of power-factor-correction capacitors to an a.c. distribution system. The frequency of this transient may range from 200 Hz to 5 KHz, depending upon the resonant frequency of the a.c. distribution system. The magnitude of the transient is expressed as a percentage of the peak 60 Hz nominal voltage (i.e., not the RMS value). The transient is assumed to be completely decayed by the end of the half-cycle in which it occurs and is assumed to occur near the peak of the nominal voltage waveform. The amplitude of the transient varies from 140% for 200 Hz ringwaves to 200% for 5 KHz ringwaves, with a linear increase in amplitude with increasing frequency. High-frequency impulse and ringwave transient events are defined as a region where the transients typically occur as a result of lightning strikes. Wave shapes applicable to this transient and general test conditions are described in ANSI/IEEE C62.41-1991 (which is incorporated herein by reference). This region of the Curve deals with both amplitude and duration (energy), rather than RMS amplitude. The intent is to provide an 80 Joule minimum transient immunity. There are two different RMS voltage sag (undervoltage) event regions defined. Generally, these transients result from application of heavy loads, as well as fault conditions, at various points in the a.c. distribution system. Sags up to 80% of nominal (maximum deviation of 20%) are assumed to have a typical duration of up to 10 seconds, and sags up to 70% of nominal (maximum deviation of 30%) are assumed to have a duration of up to 0.5 seconds. A voltage dropout (interruption) event includes both severe RMS voltage sags and complete interruptions of the applied voltage, followed by immediate re-application of the nominal voltage. The interruption may last up to 20 milliseconds. This transient typically results form the occurrence and subsequent clearing of faults in the a.c. distribution system. A no-damage region which is defined as a region where events including sags and dropouts are more severe than those specified above, and where continuously applied voltages are less than the lower limit of the steady-state tolerance range. The normal functional state of the IED is not typically expected during these conditions, but no damage to the IED should result. A prohibited region is defined as a region that any surge or swell which exceeds the upper limit of the boundary. If IED is subjected to such conditions, damages to the IED may result.

In an exemplary embodiment of the invention, a stored ITI Curve 69 is divided into quadrants by intersecting lines 78 (at nominal voltage) and 80 (at 20 ms), i.e., a grid. The quadrants are further divided into BAD (unsafe) and SAFE regions by the ITI Curve 69 itself. Data indicative of these BAD 1–3 and SAFE 1–4 regions are also stored in EEPROM 50 of the trip unit 30. Each such BAD and SAFE region is defined by the ITI Curve 69 and the intersecting lines 78, 80.

Event based waveform capture in an intelligent electronic device is well known. In accordance with known event based waveform capture, a cyclical sampling buffer constantly stores real time digitized data of per-phase currents and voltages. Further, based on a user defined event trigger condition or a pre-defined event condition this buffer is frozen to preserve a representation of several cycles before and after the occurrence of an event. While the event based waveform capture is well known, the present invention lies in analyzing the data stored in the buffer (i.e., the digitized data of per-phase currents and voltages of several cycles before and after the occurrence of an event). The data is quantified by the duration and percent voltage swing relative to nominal voltage (RMS or peak equivalent). This quantified data is then located relative to the ITI Curve 69 to determine which of the quadrants, more particularly, which SAFE or BAD region the data is in. This data may be further located as being a in region of VOLTAGE SAGS, LINE VOLTAGE SWELL, INTERRUPTS or one of the TRANSIENTS.

Figure 3:
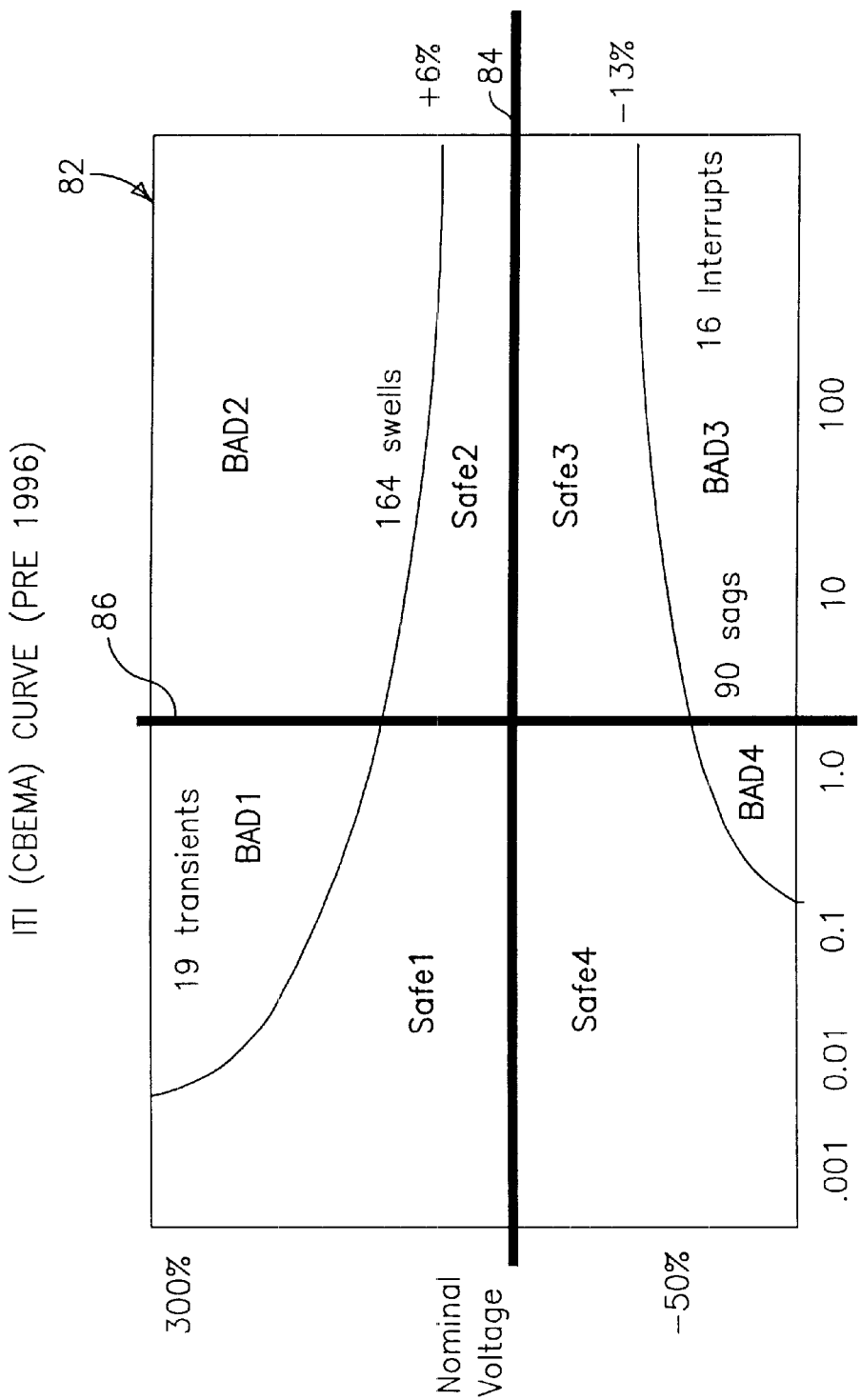
FIG. 3 is a graph of the ITI Curve (Pre-1996) divided into quadrants in an alternate exemplary embodiment of the present invention.

Referring to FIG. 3, a plot of an ITI Curve (Pre-1996) is shown at 82. In another exemplary embodiment of the invention, data indicative of the ITI Curve 82 is stored in EEPROM 50 of the trip unit 30. Several types of events are addressed by this Curve. Steady-state tolerances are defined by a steady-state range where a voltage is either very slowly varying or is constant. The term "nominal voltage" implies an ideal condition of, e.g., 120V RMS, 60 Hz. Any voltages in this range may be present for an indefinite period, and are a function of normal loadings and losses in the distribution system. A line voltage swell (surge or overvoltage) event is defined as a region where a voltage swell having an RMS amplitude of up to 106% of the RMS nominal voltage, with a duration of greater than 2000 micro seconds. This transient may occur when large loads are removed from the system or when voltage is supplied from sources other than the electric utility. Transient events are defined as a region where a sharp subcycle disturbance occurs. The frequency of such transients may range from less than 5 KHz to 5 MHz. A voltage sag (undervoltage) event region is defined as an RMS amplitude of less than 87% of the RMS nominal voltage, with a duration of greater than 2000 micro seconds. Generally, these transients result from application of heavy loads, as well as fault conditions, at various points in the a.c. distribution system. A voltage dropout (interruption) event is a complete loss of the applied voltage for greater than one cycle. A no-damage region which is defined as a region where events including sags and dropouts are more severe than those specified above, and where continuously applied voltages are less than the lower limit of the steady-state tolerance range. The normal functional state of the IED is not typically expected during these conditions, but no damage to the IED should result. A prohibited region is defined as a region that any surge or swell which exceeds the upper limit of the boundary. If IED is subjected to such conditions, damages to the IED may result.

In this embodiment, the stored ITI Curve (Pre-1996) 82 is divided into quadrants by intersecting lines 84 (at nominal voltage) and 86 (at 20 ms), i.e., a grid. The quadrants are further divided into BAD (unsafe) and SAFE regions by the ITI Curve (Pre-1996) 82 itself. Data indicative of these BAD 1–4 and SAFE 1–4 regions are also stored in EEPROM 50 of the trip unit 30. Each such BAD and SAFE region is defined by the ITI Curve (Pre-1996) 82 and the intersecting lines 84, 86. Event based waveform capture is performed within electronic trip unit 30 as discussed previously, and the data is quantified by the duration and percent voltage swing relative to nominal voltage (RMS or peak equivalent). This quantified data is then located relative to the ITI Curve 82 to determine which of the quadrants, more particularly, which SAFE or BAD region the data is in.

The data is processed (analyzed) locally at the trip unit 30, whereby the total volume of data required to be received and processed by the central monitoring station is greatly reduced. Further, it is within the scope of the present invention that other such standards (curves) may be employed with the present invention.

The analysis of the present invention may be displayed at the trip unit 30 or at a central computer (not shown). This may be displayed simply in the form of a SAFE or BAD event, by event type (i.e., VOLTAGE SAGS, LINE VOLTAGE SWELL, INTERRUPTS or one of the TRANSIENTS), or the ITI Curve may be displayed or plotted with the quantified data located thereon.

All of the aforementioned Curve parameters and other settings are preferably stored in EEPROM 50 and can be altered by downloading desired parameters via communications I/O port 62. This would include remotely downloading such data when the unit is connected to a system computer (not shown), either directly, over telephone lines, or any other suitable connection. It may also be preferred that EEPROM 50 comprises a flash memory whereby such data is flashed, as is well known.

While preferred embodiments have been shown and described, various modifications and substitutions may be made thereto without departing from the spirit and scope of the invention. Accordingly it is to be understood that the present invention has been described by way of illustrations and not limitations.

What is claimed is:

1. A method of analyzing an event at an intelligent electronic device, comprising:
    sensing an electrical signal relative to an event to provide a sensed signal indicative of an electrical characteristic thereof;
    quantifying said sensed signal relative to a reference to provide quantified data;
    determining a relationship of said quantified data relative to standards data, indicative of a standards curve, and grid data the grid data includes intersecting lines dividing the standards curve into quadrantts; and identifying said event based on said relationship.

2. The method of claim 1 wherein identifying said event comprises providing an identity of said event, said method further comprising:
    generating an event signal indicative of said identity of said event.

3. The method of claim 1 wherein said sensing said electrical signal relative to said event comprises event based waveform capturing of said electrical signal.

4. The method of claim 1 wherein said reference comprises a nominal electrical level.

5. The method of claim 4 wherein said quantifying said sensed signal comprises quantifying said sensed signal by a duration and a percent electrical level change relative to said nominal electrical level.

6. The method of claim 5 wherein said percent electrical level comprises a percent voltage level and said nominal electrical level comprises a nominal voltage level.

7. The method of claim 1 wherein said determining said relationship of said quantified data relative to said standards data comprises:
    mapping said quantified data to said standards data to in affect determine a relative positional relationship of said quantified data to said standards data.

8. The method of claim 1 wherein said standards curve comprises an Information Technology Industry designated curve.

9. The method of claim 1 wherein said determining said relationship comprises:
    determining a relationship of said quantified data relative to said standards data and grid data.

10. The method of claim 9 wherein said grid data is in affect a grid overlaid on said standards curve as indicated by said standards data.

11. The method of claim 1 wherein said identifying said event based on said relationship comprises identifying said event as one of a safe event and an unsafe event.

12. The method of claim 11 wherein identifying said event as one of a safe event and an unsafe event comprises displaying wording identifying said event as one of a safe event and an unsafe event.

13. The method of claim 11 wherein said safe event and said unsafe event each further include types thereof.

14. The method of claim 1 wherein said identifying said event based on said relationship comprises identifying said event as one of a transient, a swell, a sag and an interrupt.

15. The method of claim 1 wherein said electrical characteristic comprises electrical current.

16. The method of claim 1 wherein said electrical characteristic comprises electrical voltage.

17. The method of claim 1 further comprising:
remotely setting said reference or said standards data.

18. The method of claim 1 wherein the intelligent electronic device comprises an electronic trip unit or a protective relay.

19. The method of claim 1 further comprising:
displaying information indicating said event.

20. The method of claim 1 wherein the quadrants are divided into unsafe and safe regions by the standards curve.

21. An intelligent electronic device comprising:
a sensor for sensing an electrical signal relative to an event to provide a sensed signal indicative of an electrical characteristic thereof; and
a signal processor responsive to said sensed signal, and having memory for storing signals including program signals defining an executable program for,
quantifying said sensed signal relative to a reference to provide quantified data,
determining a relationship of said quantified data relative to standards data, indicative of a standards curve, and grid data the grid data includes intersecting line dividing the standards curve into quedrants; and,
identifying said event based on said relationship.

22. The intelligent electronic device of claim 21 wherein identifying said event comprises providing an identity of said event, and wherein said program signals further define said executable program for generating an event signal indicative of said identity of said event.

23. The intelligent electronic device of claim 21 wherein said sensor comprises an event based waveform capture system.

24. The intelligent electronic device of claim 21 wherein said reference comprises a nominal electrical level.

25. The intelligent electronic device of claim 24 wherein said quantifying said sensed signal comprises quantifying said sensed signal by a duration and a percent electrical level change relative to said nominal electrical level.

26. The intelligent electronic device of claim 25 wherein said percent electrical level comprises a percent voltage level and said nominal electrical level comprises a nominal voltage level.

27. The intelligent electronic device of claim 21 wherein said determining said relationship of said quantified data relative to said standards data comprises:
mapping said quantified data to said standards data to in affect determine a relative positional relationship of said quantified data to said standards data.

28. The intelligent electronic device of claim 21 wherein said standards curve comprises an Information Technology Industry designated curve.

29. The intelligent electronic device of claim 21 wherein said determining said relationship comprises:
determining a relationship of said quantified data relative to said standards data and grid data.

30. The intelligent electronic device of claim 29 wherein said grid data is in affect a grid overlaid on said standards curve as indicated by said standards data.

31. The intelligent electronic device of claim 21 wherein said identifying said event based on said relationship comprises identifying said event as one of a safe event and an unsafe event.

32. The intelligent electronic device of claim 31 wherein said safe event and said unsafe event each further include types thereof.

33. The intelligent electronic device of claim 31 wherein identifying said event as one of a safe event and an unsafe event comprises displaying wording identifying said event as one of a safe event and an unsafe event.

34. The intelligent electronic device of claim 21 wherein said identifying said event based on said relationship comprises identifying said event as one of a transient, a swell, a sag and an interrupt.

35. The intelligent electronic device of claim 21 wherein said electrical characteristic comprises electrical current.

36. The intelligent electronic device of claim 21 wherein said electrical characteristic comprises electrical voltage.

37. The intelligent electronic device of claim 21 further comprising: remotely setting said reference or said standards data.

38. The intelligent electronic device of claim 21 wherein the intelligent electronic device comprises an electronic trip unit or a protective relay.

39. The intelligent electronic device of claim 21 further comprising:
a display responsive to a near-trip event signal for displaying information indicating detection of a near-trip event.

40. The intelligent electronic device of claim 21 wherein the quadrants are divided into unsafe and safe regions by the standards curve.

41. An intelligent electronic system comprising:
a sensor for sensing an electrical signal relative to an event to provide a sensed signal indicative of an electrical characteristic thereof; and
a signal processor responsive to said sensed signal, and having memory for storing signals including program signals defining an executable program for,
quantifying said sensed signal relative to a reference to provide quantified data,
determining a relationship of said quantified data relative to standards data,
indicative of a standards curve, and grid data the grid data includes intersecting lines dividing the standards curve into quadrants; and,
identifying said event based on said relationship.

42. The intelligent electronic system of claim 41 wherein identifying said event comprises providing an identity of said event, and wherein said program signals further define said executable program for generating an event signal indicative of said identity of said event.

43. The intelligent electronic system of claim 41 wherein said reference comprises a nominal electrical level.

44. The intelligent electronic system of claim 43 wherein said quantifying said sensed signal comprises quantifying said sensed signal by a duration and a percent electrical level change relative to said nominal electrical level.

45. The intelligent electronic system of claim 41 wherein said determining said relationship of said quantified data relative to said standards data comprises:

mapping said quantified data to said standards data to in affect determine a relative positional relationship of said quantified data to said standards data.

46. The intelligent electronic system of claim 41 comprising an electronic device.

47. The intelligent electronic system of claim 46 wherein the electronic device is an electronic trip unit or a protective relay.

48. The intelligent electronic system of claim 46 comprising a plurality of electronic devices.

49. The intelligent electronic system of claim 46 wherein the electronic device includes the sensor.

50. The intelligent electronic system of claim 41 comprising a central monitoring station.

* * * * *